US010629879B2

(12) United States Patent
Qin et al.

(10) Patent No.: US 10,629,879 B2
(45) Date of Patent: Apr. 21, 2020

(54) BATTERY MODULE

(71) Applicant: Contemporary Amperex Technology Co., Limited, Ningde, Fujian (CN)

(72) Inventors: Feng Qin, Ningde (CN); Zhi Wang, Ningde (CN); Lin Ma, Ningde (CN); Hua Zhang, Ningde (CN); Xiaofan Wang, Ningde (CN); Xinfu Xiao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 67 days.

(21) Appl. No.: 16/050,819

(22) Filed: Jul. 31, 2018

(65) Prior Publication Data

US 2019/0245175 A1    Aug. 8, 2019

(30) Foreign Application Priority Data

Feb. 7, 2018   (CN) .................... 2018 2 0214364 U (51) Int. Cl.
*H01M 2/12*   (2006.01)
*H01M 2/10*   (2006.01)
(Continued)

(52) U.S. Cl.
CPC ....... *H01M 2/1252* (2013.01); *H01M 2/1016* (2013.01); *H01M 2/1077* (2013.01);
(Continued)

(58) Field of Classification Search
CPC .......................... H01M 2/1223; H01M 2/1235
See application file for complete search history.

(56) References Cited

U.S. PATENT DOCUMENTS 6,649,301 B1 * 11/2003 Oh .................. H01M 2/0413
429/56
9,012,050 B2    4/2015 Byun et al.
(Continued)

FOREIGN PATENT DOCUMENTS

CN       104979521 A    10/2015
EP         2450978 A2     5/2012
(Continued)

OTHER PUBLICATIONS

The First Official Action dated Jul. 29, 2019 for Japanese application No. 2018-143976, 3 pages.
(Continued)

*Primary Examiner* — Matthew J Merkling
(74) *Attorney, Agent, or Firm* — Law Offices of Liaoteng Wang (57) ABSTRACT

The present disclosure relates to a battery module, including: a housing having two oppositely disposed openings and a hollow chamber communicating with the two openings in a first direction; a battery stack disposed in the hollow chamber and comprising two or more battery cells, wherein each battery cell has first and second vent plates disposed opposite to each other in the first direction; a first end plate corresponding to one of the two openings and connected to the housing, wherein the first end plate is provided with a module output pole electrically connected to the battery stack and a deformable plate disposed opposite to the module output pole, and the deformable plate faces the first vent plate; a second end plate corresponding to the other of the two openings and connected to the housing; and a blocking member disposed between the second end plate and the battery stack.

10 Claims, 4 Drawing Sheets

(51) Int. Cl.
  *H01M 2/18*    (2006.01)
  *H01M 2/30*    (2006.01)
  *H01M 2/14*    (2006.01)
  *H01M 10/04*   (2006.01)
  *H01M 2/20*    (2006.01)

(52) U.S. Cl.
  CPC ....... *H01M 2/1094* (2013.01); *H01M 2/1205* (2013.01); *H01M 2/1229* (2013.01); *H01M 2/14* (2013.01); *H01M 2/18* (2013.01); *H01M 2/202* (2013.01); *H01M 2/30* (2013.01); *H01M 10/0468* (2013.01)

(56) References Cited

U.S. PATENT DOCUMENTS

2011/0020675 A1*  1/2011  Pei ................ H01M 2/0408
                                                            429/56
2013/0065100 A1*  3/2013  Kim ................ H01M 2/0404
                                                            429/82
2015/0132618 A1   5/2015  Han
2016/0149192 A1   5/2016  Motokawa
2017/0077484 A1   3/2017  Li et al.
2018/0062133 A1*  3/2018  Kim ................ H01M 2/1235
2019/0067659 A1*  2/2019  Karulkar ......... H01M 2/1223

FOREIGN PATENT DOCUMENTS

EP    2450980 A2      5/2012
EP    3249716 A1     11/2017
JP    2017139159 A    8/2017

OTHER PUBLICATIONS

The extended European search report dated Jan. 23, 2019 for European application No. 18186064.4, 5 pages.

* cited by examiner

BATTERY MODULE

CROSS-REFERENCE TO RELATED APPLICATION

This application is based upon and claims priority to Chinese Patent Application No. 201820214364.3, filed on Feb. 7, 2018, the content of which is incorporated herein by reference in its entirety.

TECHNICAL FIELD

The present disclosure relates to the field of battery technology, and more particularly to a battery module.

BACKGROUND

At present, in order to improve safety performance of the battery module, a vent plate is generally provided on a cap plate of a battery cell that constitutes the battery module, and a large amount of high-temperature and high-pressure gas generated at the instant of failure of the battery cell is released through the vent plate.

Especially for a battery cell structure in which two output poles of the battery cell are arranged opposite to each other (i.e., the two output poles are not in a same plane), a vent plate is provided on a cap plate of each output pole. That is, both cap plates of the battery cell are provided with the vent plate. The installation of the vent plate can improve the safety performance of the battery cell to a certain extent. However, when such a battery cell is applied to a battery module, especially when applied to a battery module having its output poles at a same side, it may be difficult to form an external short circuit for the battery module to fuse a charging circuit of the battery module and thus prevent overcharge of the battery module when the overcharge occurs. Therefore, there is a potential safety hazard. It may be impossible to ensure the safe use of the battery module, and may easily cause damage or explosion of a part or all of the battery cells.

SUMMARY

According to embodiments of the present disclosure, a battery module is provided. The battery module includes: a housing having two oppositely disposed openings and a hollow chamber communicating with the two openings in a first direction; a battery stack disposed in the hollow chamber and including two or more battery cells stacked in a second direction and electrically connected to each other, wherein each of the two or more battery cells has a first vent plate and a second vent plate disposed opposite to each other in the first direction; a first end plate corresponding to one of the two openings and connected to the housing, wherein the first end plate is provided with a module output pole electrically connected to the battery stack and a deformable plate disposed opposite to the module output pole, and the deformable plate faces the first vent plate such that the deformable plate deforms and is electrically connected to the module output pole when the first vent plate is opened; a second end plate corresponding to the other of the two openings and connected to the housing; and a blocking member disposed between the second end plate and the battery stack such that a pressure for opening the second vent plate is greater than a pressure for opening the first vent plate.

According to an aspect of the embodiments of the present disclosure, the blocking member includes an abutment portion and an adapter portion connected to each other; the abutment portion is disposed opposite to the second vent plate of each of the two or more battery cells; and the adapter portion is connected with the second end plate.

According to an aspect of the embodiments of the present disclosure, the abutment portion includes a plate-like structure extending in the second direction; the plate-like structure has a first surface and a second surface disposed opposite to each other in a thickness direction of the plate-like structure; the first surface faces the second end plate; the second surface faces the second vent plate; and the first direction is perpendicular to the second direction.

According to an aspect of the embodiments of the present disclosure, a gap of 0 mm to 2 mm is reserved between the second surface and the second vent plate.

According to an aspect of the embodiments of the present disclosure, the plate-like structure has a thickness of 0.5 mm to 4 mm in the thickness direction.

According to an aspect of the embodiments of the present disclosure, the plate-like structure is provided with an open notch that penetrates the plate-like structure in the thickness direction.

According to an aspect of the embodiments of the present disclosure, the adapter portion includes a columnar structure extending in the first direction and having an end connected to the abutment portion and other end connected to the second end plate.

According to an aspect of the embodiments of the present disclosure, the columnar structure is provided with a recess along its axial direction.

According to an aspect of the embodiments of the present disclosure, the blocking member includes one adapter portion that is connected at a center position or a position close to a center of the abutment portion; or the blocking member includes two or more adapter portions that are spaced apart from each other in the first direction, wherein each of the two or more adapter portions is located between the second vent plates of two adjacent battery cells.

According to an aspect of the embodiments of the present disclosure, the first end plate and the second end plate are tightly connected with the housing to seal the housing, and the first end plate and/or the second end plate are provided with a module vent plate.

BRIEF DESCRIPTION OF THE DRAWINGS

Features, advantages, and technical effects of exemplary embodiments of the present disclosure will be described below with reference to the accompanying drawings.

REFERENCE LABELS IN THE FIGURES:

X—First direction;
Y—Second direction;
10—Housing;
11—Opening;
20—Battery stack;
21—Battery cell;
211—First vent plate;
212—Second vent plate;
30—First end plate;
31—Module output pole;
32—Deformable plate;
33—Body portion;
34—Connection portion;
40—Second end plate;
50—Blocking member;
51—Abutment portion;
511—First surface;
512—Second surface;
513—Open notch;
52—Adapter portion;
521—End;
522—Recess;
60—Connection piece;
70—Module vent plate.

In the drawings, the same reference numbers denote the same features. The drawings are not shown in actual scale.

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the cap assembly and the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate a direct connection or an indirect connection. For those skilled in the art, specific meanings of the above terms in the present disclosure may be understood depending on specific situations.

For a better understanding of the present disclosure, the battery module according to the embodiments of the present disclosure will be described in detail with reference to FIG. 1 to FIG. 8.

Figure 1:
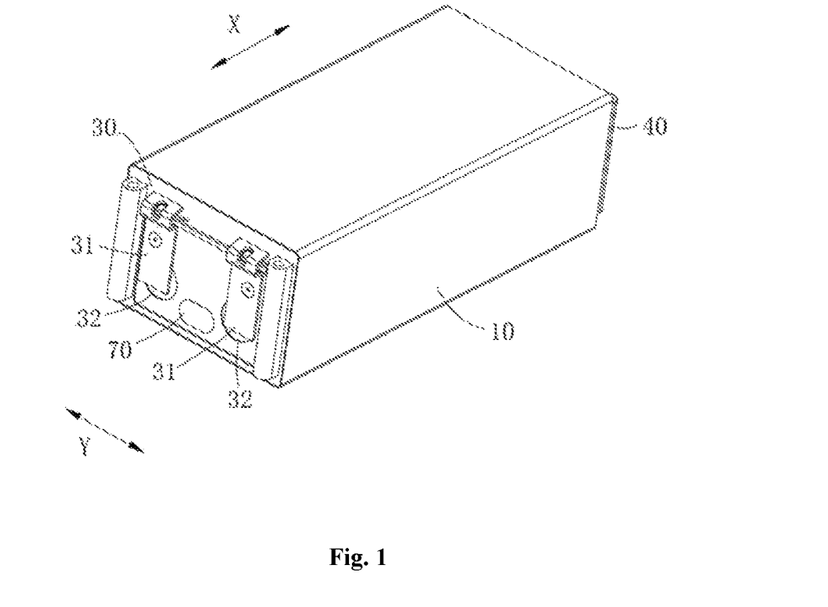
FIG. 1 is a schematic diagram of an overall structure of a battery module according to an embodiment of the present disclosure.
Figure 2:
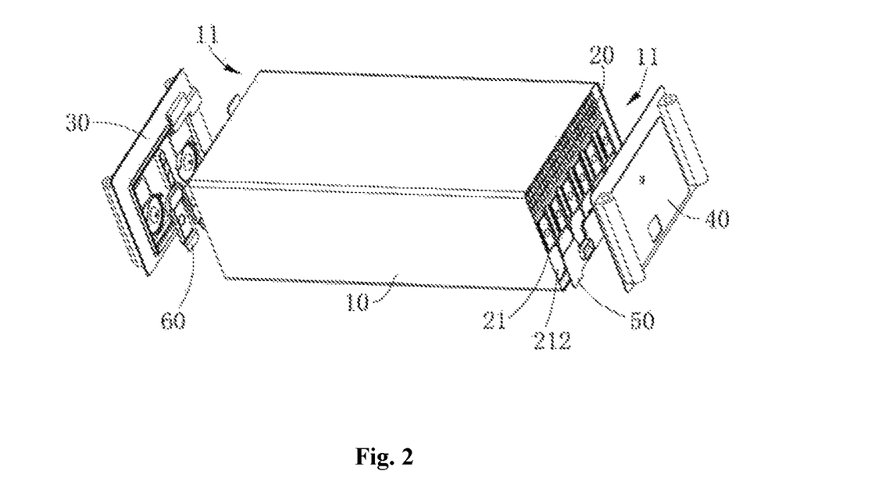
FIG. 2 is a schematic exploded diagram of a battery module according to an embodiment of the present disclosure, as viewed from a viewpoint.
Figure 3:
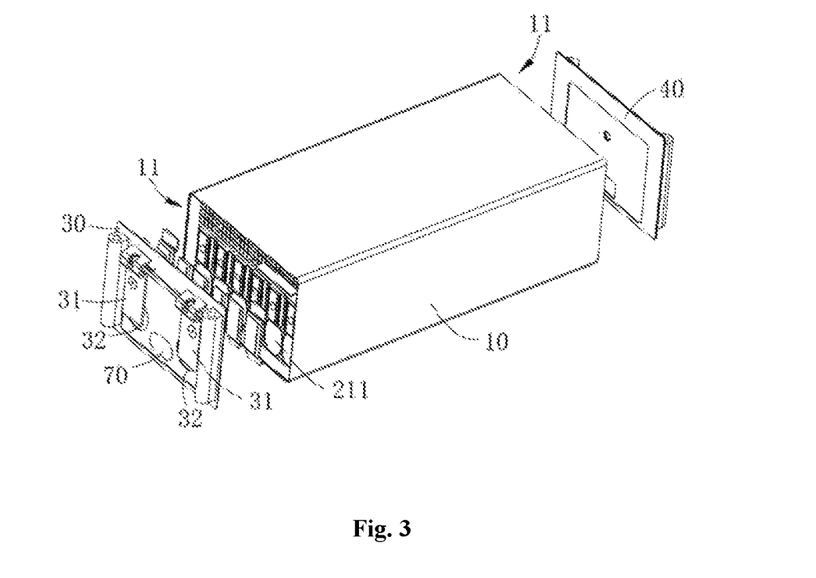
FIG. 3 is a schematic exploded diagram of the battery module according to another embodiment of the present disclosure, as viewed from another viewpoint.

Referring to FIG. 1, FIG. 2 and FIG. 3, FIG. 1 is a schematic diagram of an overall structure of a battery module according to an embodiment of the present disclosure, FIG. 2 is a schematic exploded diagram of a battery module according to an embodiment of the present disclosure, as viewed from a viewpoint, and FIG. 3 is a schematic exploded diagram of the battery module according to another embodiment of the present disclosure, as viewed from another viewpoint.

The battery module provided by some embodiments of the present disclosure may include a housing 10, a battery stack 20, a first end plate 30, a second end plate 40, and a blocking member 50. The housing 10 has two oppositely disposed openings 11 and a hollow chamber communicating with the two openings 11 in the first direction X. The battery stack 20 is disposed in the hollow chamber of the housing 10 and includes two or more battery cells 21 stacked in the second direction Y and electrically connected to each other. Each battery cell 21 has a first vent plate 211 and a second vent plate 212 disposed opposite to each other in the first direction X. The first end plate 30 corresponds to one of the two openings 11 and is connected to the housing 10. The first end plate 30 is provided with a module output pole 31 electrically connected to the battery stack 20 and a deformable plate 32 disposed opposite to the module output pole 31. The deformable plate 32 faces the first vent plate 211, so that the deformable plate 32 can deform and be electrically connected to the module output pole 31 when the first vent plate 211 is opened. The second end plate 40 corresponds to the other of the two openings 11 and is connected to the housing 10. The blocking member 50 is disposed between the second end plate 40 and the battery stack 20 such that a pressure for opening the second vent plate 212 is greater than a pressure for opening the first vent plate 211.

Specifically, in the embodiment, the housing 10 is preferably a hollow rectangular barrel structure. A direction along which the two openings 11 are arranged is a length direction of the housing 10. Preferably, the size of the housing 10 in its length direction is larger than its sizes in its width and height directions. The first direction X is the direction along which the two openings 11 are arranged and spaced apart from each other.

Figure 4:
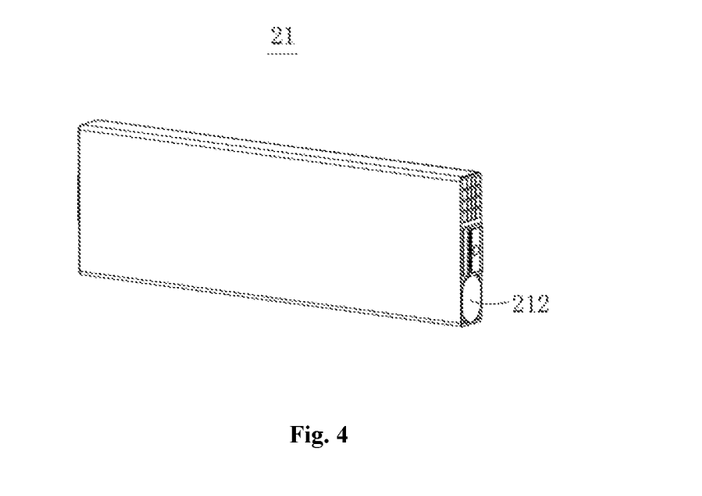
FIG. 4 is a schematic structural diagram of the battery cell in FIG. 2.

Referring to FIG. 4, it shows a schematic structural diagram of the battery cell 21 in FIG. 2. In the embodiment, the battery stack 20 includes six battery cells 21 connected to each other in series and/or in parallel through a connection piece 60. As shown in FIG. 4, the output poles of each battery cell 21 are located on both sides of the battery cell 21. In the embodiment, the two output poles of the battery cell 21 are respectively located on both sides of the battery cell 21 in the first direction X. In order to ensure the safety of the battery cell 21 under the overcharge condition of the battery module, the battery cell 21 may be provided with the first vent plate 211 and the second vent plate 212 at positions corresponding to its two output poles. In a specific implementation, the housing of the battery cell 21, the first vent plate 211 and the second vent plate 212 are preferably made of a plastic material.

The second direction Y is preferably perpendicular to the first direction X. The six battery cells 21 are stacked on each other in the second direction Y such that the two output poles of each battery cell 21 face the two openings 11 of the housing 10 respectively.

Figure 5:
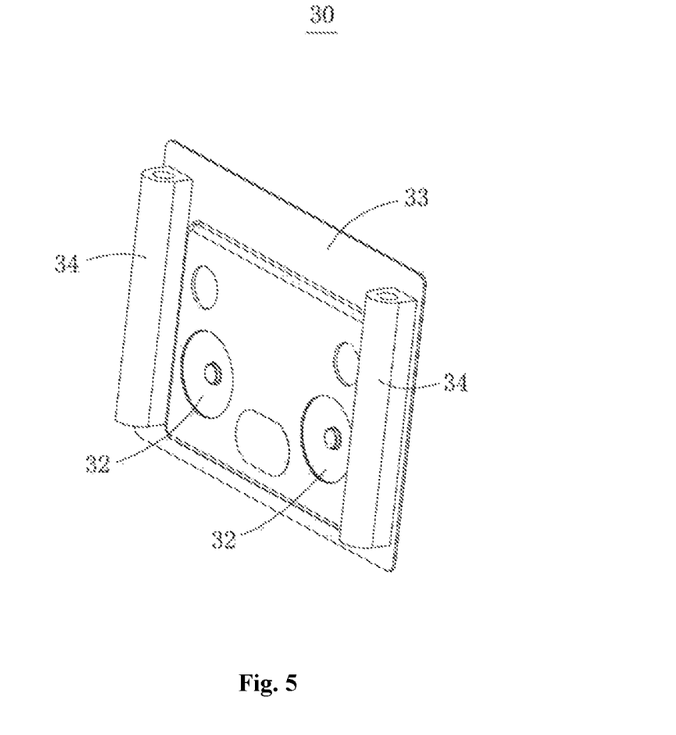
FIG. 5 is a schematic structural diagram of a first end plate shown in FIG. 2.

Referring to FIG. 5, it shows a schematic structural diagram of the first end plate 30 in FIG. 2. Each of the first end plate 30 and the second end plate 40 includes a body portion 33 in a plate-like form and connection portions 34 positioned at both ends of the body portion 33 and connected to the body portion 33 in the second direction Y. The battery module can be connected to an outside part (e.g. a bottom of a battery box) via the connection portions 34. The main body portions 33 of the first end plate 30 and the second end plate 40 are respectively disposed in the two openings 11 of the housing 10 and connected to the housing 10. The connection is preferably a sealed connection, such as a welding connection, a bonding connection, or the like.

The module output pole 31 for satisfying charge and discharge requirements of the battery module is disposed on the body portion 33 of the first end plate 30. The module output pole 31 includes a positive output pole and a negative output pole. That is, both the positive and negative output poles of the battery module are located on the first end plate 30 of the battery module, and may be connected with the first end plate 30 by a detachable snap connection or a fastener connection. Of course, it is also possible to use a fixed connection such as a welding connection, as long as the connection satisfies the charge and discharge requirements of the battery module.

As the battery module is charged, overcharge or the like may occur. Therefore, in order to ensure the safety of the battery module under an overcharge condition, the deformable plate 32 is disposed on the first end plate 30 at a position opposite to the output pole 31 of the battery module. In the embodiment, two deformable plates 32 are disposed, which respectively correspond to the positive output pole and the negative output pole of the battery module. The deformable plates 32 are in a free state. That is, the deformable plates 32 are disposed separately from the module output poles and do not contact the module output poles when no external force is applied, so as to ensure normal operations of a charge or discharge process of the battery module.

The first vent plate 211 and the second vent plate 212 are respectively arranged on the cap plate of the battery cell 21, so that a large amount of high-temperature high-pressure gas generated at the instant of failure of the battery cell 21 can be released and the first vent plate 211 and the second vent plate 212 are flushed out. When the first vent plate 211 is flushed out, the released gas pressure can cause the deformable plate 32 to deform and be electrically connected to the corresponding module output pole 31, such that an external short circuit for the battery module can be formed and the charging circuit of the battery module can be cut off.

In order to enable the charging circuit of the battery module to be cut off more easily, in a preferred embodiment, a fuse is further provided on the charging circuit of the battery module, and the fuse is preferably positioned on the connection piece 60 for connecting the six battery cells 21. When the overcharge of the battery module occurs, the deformable plate 32 can deform and the fuse on the charging circuit of the battery module can be quickly broken off to ensure the safety of the battery module.

As the respective blocking member 50 is disposed to make the pressure for opening the second vent plate 212 greater than the pressure for opening the first vent plate 211, when the overcharge of the battery module occurs, it may be possible to ensure the first vent plate 211 to be opened first so as to allow the deformable plate 32 to smoothly deform and cut off the charging circuit of the battery module at the fastest speed.

Figure 6:
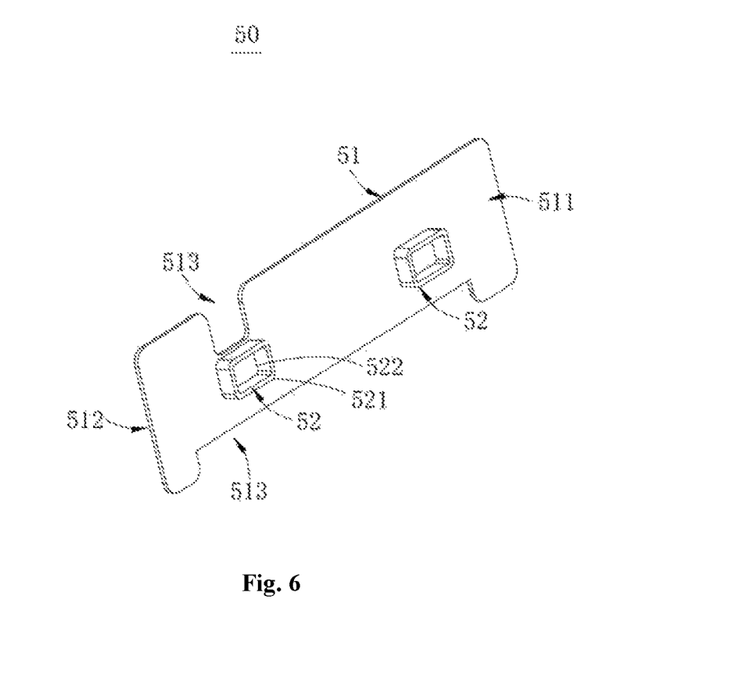
FIG. 6 is a schematic structural diagram of a blocking member shown in FIG. 2.

Referring to FIG. 6, it shows a schematic structural diagram of the blocking member 50 in FIG. 2. In an optional embodiment, the blocking member 50 includes an abutment portion 51 and an adapter portion 52 connected to each other. The abutment portion 51 is disposed opposite to the second vent plate 212 of each battery cell 21, and the adapter portion 52 is connected with the second end plate 40. The blocking member 50 with the above structure is easy to process and has a low cost.

At the same time, with the abutment portion 51 of the blocking member 50 disposed opposite to the second vent plate 212, the force required for the second vent plate 212 from expansion to explosion during the overcharge of the battery cell 21 can be increased. As a result, when gas is generated during the overcharge of the battery module, the first vent plate 211 can be opened first under the gas pressure to make the charging circuit of the battery module to be cut off in shortest time. It is possible to prevent the second vent plate 212 from being opened first to cause the deformable plate 32 unable to deform or delayed to deform, and thus avoid the occurrence of the charging circuit of the battery module being unable or delayed to be cut off, so as to better ensure the safety of the battery module. Since there is a certain distance between the second end plate 40 and the battery stack 20, the blocking member 50 can be more easily connected with the second end plate 40 through the adapter portion 52 under the premise of ensuring that the second vent plate 212 is opened later than the first vent plate 211.

As an alternative implementation, in the embodiment, the abutment portion 51 may include a plate-like structure extending along the second direction Y. The plate-like structure has a first surface 511 and a second surface disposed opposite to each other in its own thickness direction. The first surface 511 faces the second end plate 40, and the second surface 512 faces the second vent plate 212. The abutment portion 51 with such a structure can press against the second vent plate 212 of each battery cell 21 in the battery stack 20 to prevent the second vent plate 212 of each battery cell 21 from being deformed and broken prior to the corresponding first vent plate 211. Meanwhile, with the above-described structure, it is possible to save the space occupied by the blocking member 50 inside the battery module. Each of the first surface 511 and the second surface 512 is preferably a plane. Of course, uneven areas existing on the first surface 511 and the second surface 512 due to a certain processing error or the like are also allowed.

According to an aspect of the embodiments of the present disclosure, a gap is reserved between the second surface 512 and the second vent plate 212 of each battery cell 21. The gap may be any value between 0 mm and 2 mm, including two end values of 0 mm and 2 mm, and preferably between 0.5 mm and 1.5 mm. By reserving the gap between the second surface 512 of the plate-like structure and each second vent plate 212, under the premise of ensuring the second vent plate 212 is opened later than the first vent plate 211, a certain processing error or assembly error margin can be reserved for the processing and assembly of various components of the battery module, which facilitates the processing and assembly of the battery module as a whole. Meanwhile, when the gap is 0 mm, i.e., the second surface 512 contacts with the second vent plate 212, in addition to the above described advantages, the blocking member 50 can be connected with the second end plate 40 by contacting and abutting to each other, so the operation is convenient and the assembly of the blocking member 50 can be simplified. When the gap is greater than 0 mm, a certain amount of deformation can be allowed for the second vent plate 212, so that the gas pressure inside the battery cell 21 can be released and thus the safety of the battery cell 21 can be better ensured.

Optionally, the thickness of the plate-like structure in its thickness direction may be any value between 0.5 mm and 4 mm, including two end values of 0.5 mm and 4 mm, and preferably between 1 mm and 2 mm. The plate-like structure with the above-mentioned thickness can ensure that the pressure for opening the second vent plate 212 is greater than the pressure for opening the first vent plate 211, such that the second vent plate 212 can be further broken when it is not enough to release the internal pressure of the battery cell 21 by the broken first vent plate 211, thereby providing further protection to the battery cell 21.

In addition to having structures relative to the abutment portion 51, the cap plate of the second vent plate 212 of the battery cell 20 also needs to be provided with some other structures for the battery module, e.g. the connection piece 60 for electrically connecting each battery cell 21 in the battery stack 20. Therefore, as an alternative implementation, the plate-like structure of the abutment portion 51 is further provided with an open notch 513. The open notch 523 penetrates the plate-like structure in the thickness direction, so as to reduce interference with the installation of other components of the battery module such as the connecting piece 60 and the like. The shape and size of the open notch 513 and its position on the plate-like structure are not specifically limited as long as the installation requirements of the battery module can be met without affecting the resistance deformation requirement as the second vent plate 212 is deformed.

As an alternative implementation, the adapter portion 52 includes a columnar structure extending in the first direction X. The columnar structure has an end 521 connected to the abutment portion 51. Particularly, the end of the columnar structure and the abutment portion 51 may be welded or integrally formed. The other end 521 of the columnar structure is connected to the second end plate 40, and specifically connected by welding, bonding, or the like. The arrangement of the adapter portion 52 can reserve a certain processing error or assembly error margin for the processing and assembly of various components of the battery module, which facilitates the processing and assembly of the battery module as a whole. Also, the adapter portion 52 facilitates to fix the relative position of the blocking member 50 between the battery stack 20 and the second end plate 40, avoids the change of the relative position between the blocking member 50 and the second vent plate 212 of each battery cell 21, and thus better ensures the blocking effect of the blocking member 50.

In the embodiment, two adapter portions 52 are provided and spaced apart from each other in the first direction X. When installed in the battery module, each of the adapter portions 52 is preferably located between the second vent plates 212 of adjacent two battery cells 21 such that the second vent plates can be normally opened without being affected by the adapter portions 52 when the internal pressure of the battery cell 21 is too large and the safety of the battery cell 21 can be ensured. In the embodiment, an orthographic projection of the adapter portion 52 on the plate-like structure of the abutment portion 51 is a square.

Alternatively, the columnar structure of the adapter portion 52 is provided with a recess 522 along its own axial direction. In this way, the weight of the entire blocking member 50 can be reduced under the premise of satisfying the requirement of the connection with the second end plate 40. The recess 522 may be a through hole penetrating the adapter portion 52 and the second surface 512 of the abutment portion 51. Of course, it may also be a groove extending along the axial direction of the columnar structure. The extending length of the groove may be equal to the axial length of the columnar structure, and may also be less than the axial length of the columnar structure so that the recess 522 has not only a function of weight reduction but also a function of overflowing glue.

Since it takes a certain time for the entire process from the opening of the first vent plate 211, the deforming of the deformable plate 32 to the cutoff of the charging circuit of the battery module, as an alternative implementation, a module vent plate 70 is disposed on the first end plate 30 and/or the second end plate 40 to provide double protection for the battery module, so as to ensure the safety of the battery module at different moments.

Although the battery stack 20 are described as including six battery cells 21 as an example in the above embodiments, it can be understood that the number of the battery cells 21 is not limited to six and can be set according to the requirements of the battery module. There may be more than six, of course, less than six battery cells 21.

The above-mentioned first direction X and second direction Y are preferably perpendicular to each other, but are not limited to being perpendicular to each other. A certain processing error of the housing 10 or a certain assembly error of the battery stack 20 is allowed. That is, the angle between the first direction X and the second direction Y may be 90° or close to 90°.

Figure 7:
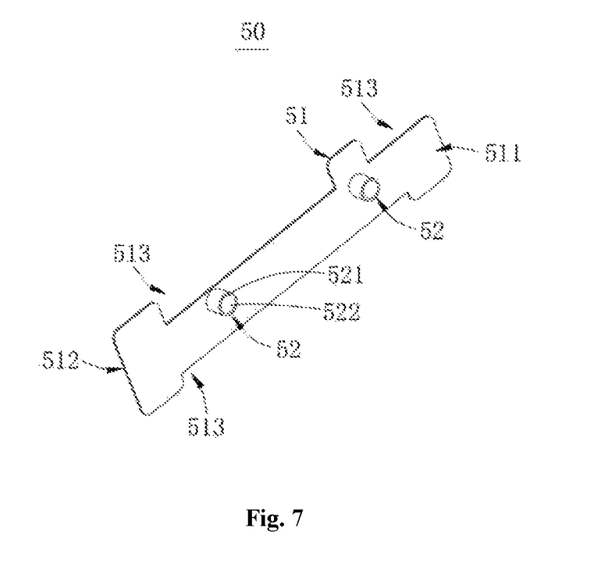
FIG. 7 is a schematic structural diagram of a blocking member according to another embodiment of the present disclosure.

FIG. 7 shows a schematic structural diagram of a blocking member 50 according to another embodiment of the present disclosure. The orthographic projection of the adapter portion 52 of the blocking member 50 on the plate-like structure in the above embodiments is not limited to a square. As shown in FIG. 7, in an example, the orthographic projection of the adapter portion 52 on the plate-like structure may also be a circle. Of course, it may be an ellipse, a lumbar circle, or other irregular shapes, etc., as long as the requirements of the connection with the second end plate 40 and the plate-like structure can be satisfied. The position and size of the open notch 513 can also be adjusted according to the installation requirements.

Figure 8:
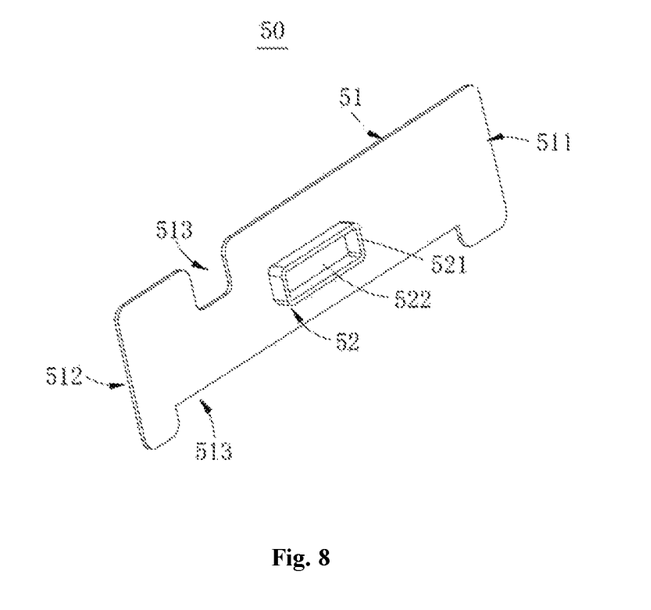
FIG. 8 is a schematic structural diagram of a blocking member according to yet another embodiment of the present disclosure.

Referring to FIG. 8, a schematic structural diagram of a blocking member 50 according to yet another embodiment of the present disclosure is shown. The blocking member 50 in each of the above embodiments includes two adapter portions 52. It can be understood that that is an alternative embodiment, but is not limited to the foregoing structures. As shown in FIG. 8, the blocking member 50 may include only one adapter portion 52, and the one adapter portion 52 is preferably connected at a center position or an area close to the center position of the abutment portion 51. In order to ensure the strength of the connection with the second end plate 40, the extending length of the adapter portion 52 in the first direction X may be longer in the embodiment. Of course, in some embodiments, there may be a plurality of adapter portions 52 as needed, e.g. three or more adapter portions. The plurality of adapter portions 52 are spaced apart from each other on the abutment portion 51 in the first direction X. The interval can be set according to the size of the battery module, etc., which will not be described here.

As described above, the battery module provided by the embodiments of the present disclosure includes the housing 10, the battery stack 20, the first end plate 30, the second end plate 40, and the blocking member 50. The battery cell 21 has the first vent plate 211 and the second vent plate 212 disposed opposite to each other. The first end plate 30 is disposed in one of the openings 11 of the housing 10, and provided with the module output pole 31 and the deformable plate 32 disposed opposite to the module output pole 31. The deformable plate 32 can deform and be electrically connected to the module output pole 31 when the first vent plate 211 is opened, so as to protect each battery cell 21 when the overcharge of the battery module occurs. Since the blocking member 50 is provided between the second end plate 40 and the battery stack 20, the pressure for opening the second vent plate 212 is greater than the pressure for opening the first vent plate 211. Thus when the overcharge of the battery module occurs, it may be possible to ensure the first vent plate 211 to be opened first so as to allow the deformable plate 32 to smoothly deform. Accordingly, the battery module meets the requirements of power supply, and meanwhile the safety performance of each battery cell 21 under the overcharge condition of the battery module can be ensured, so it is easy to promote and use the battery module.

Although the present disclosure has been described with reference to preferred embodiments, various modifications may be made thereto and the equivalents may be substituted for the components therein without departing from the scope of the present disclosure. In particular, as long as there is no structural conflict, the various technical features mentioned in the various embodiments can be combined in any manner. The present disclosure is not limited to the specific embodiments disclosed herein, but includes all technical solutions that fall within the scope of the claims.

What is claimed is:

1. A battery module, comprising:
   a housing having two oppositely disposed openings and a hollow chamber communicating with the two oppositely disposed openings in a first direction;
   a battery stack disposed in the hollow chamber and comprising two or more battery cells stacked in a second direction and electrically connected to each other, wherein each of the two or more battery cells has a first vent plate and a second vent plate disposed opposite to each other in the first direction;
   a first end plate corresponding to one of the two oppositely disposed openings and connected to the housing, wherein the first end plate is provided with a module output pole electrically connected to the battery stack and a deformable plate disposed opposite to the module output pole, and the deformable plate faces the first vent plate such that the deformable plate deforms and is electrically connected to the module output pole when the first vent plate is opened;
   a second end plate corresponding to the other of the two oppositely disposed openings and connected to the housing; and
   a blocking member disposed between the second end plate and the battery stack such that a pressure for opening the second vent plate is greater than a pressure for opening the first vent plate.

2. The battery module of claim 1, wherein the blocking member comprises an abutment portion and an adapter portion connected to each other; the abutment portion is disposed opposite to the second vent plate of each of the two or more battery cells; and the adapter portion is connected with the second end plate.

3. The battery module of claim 2, wherein the abutment portion comprises a plate-like structure extending in the second direction; the plate-like structure has a first surface and a second surface disposed opposite to each other in a thickness direction of the plate-like structure; the first surface faces the second end plate; the second surface faces the second vent plate; and the first direction is perpendicular to the second direction.

4. The battery module of claim 3, wherein a gap of 0 mm to 2 mm is reserved between the second surface and the second vent plate.

5. The battery module of claim 3, wherein the plate-like structure has a thickness of 0.5 mm to 4 mm in the thickness direction.

6. The battery module of claim 3, wherein the plate-like structure is provided with an open notch that penetrates the plate-like structure in the thickness direction.

7. The battery module of claim 2, wherein the adapter portion comprises a columnar structure extending in the first direction and having an end connected to the abutment portion and other end connected to the second end plate.

8. The battery module of claim 7, wherein the columnar structure is provided with a recess along its axial direction.

9. The battery module of claim 7, wherein the blocking member comprises one adapter portion that is connected at a center position or a position close to a center of the abutment portion; or
   the blocking member comprises two or more adapter portions that are spaced apart from each other in the first direction, wherein each of the two or more adapter portions is located between the second vent plates of two adjacent battery cells.

10. The battery module of claim 1, wherein the first end plate and the second end plate are tightly connected with the housing to seal the housing, and the first end plate and/or the second end plate are provided with a module vent plate.

* * * * *